June 21, 1932.　　B. A. THARRINGTON　　1,864,263

INKWELL

Filed Feb. 9, 1932

Inventor
Bruce A. Tharrington,

By Clarence A. O'Brien
Attorney

Patented June 21, 1932

1,864,263

UNITED STATES PATENT OFFICE

BRUCE ALLEN THARRINGTON, OF ROSWELL, IDAHO

INKWELL

Application filed February 9, 1932. Serial No. 591,858.

The present invention relates to new and useful improvements in ink wells and has for its primary object to provide, in a manner as hereinafter set forth, an ink well embodying a novel construction, combination and arrangement of parts through the medium of which ink from a support reservoir will be maintained at a constant level in the well until the ink in the said reservoir is substantially exhausted.

Another important object of the invention is to provide an ink well of the type including a reservoir, the construction and arrangement of the reservoir and well being such that the device will require a minimum of space.

Another important object of the invention is to provide an ink well including a reservoir, the arrangement being such that a pen may be inserted in the well from the front or either side.

Other objects of the invention are to provide an ink well of the character described which will be simple in construction, strong, durable, thoroughly reliable and efficient in use, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1:
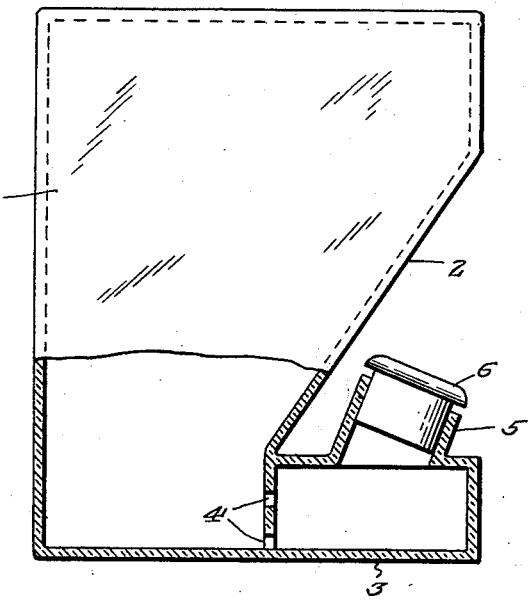
Figure 1 is a view partially in side elevation and partially in vertical section of an ink well constructed in accordance with the present invention.
Figure 2:
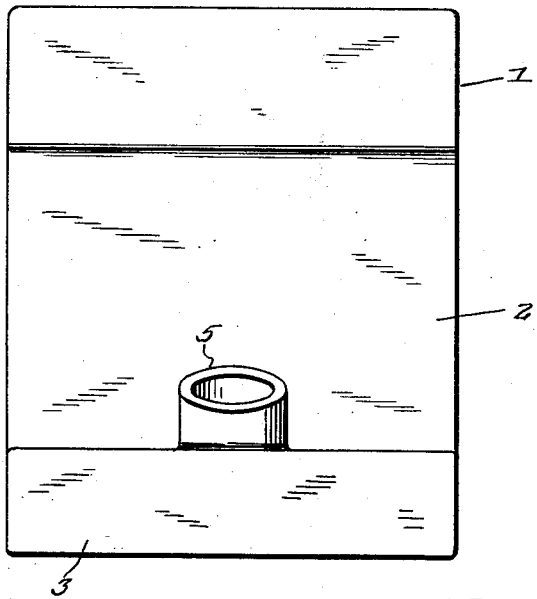
Figure 2 is a view in front elevation thereof.

Referring now to the drawing in detail, it will be seen that the reference numeral 1 designates an ink reservoir of suitable size and shape having its front undercut, as at 2, said undercut extending the entire width of the reservoir, as clearly seen in Figure 2 of the drawing.

Formed integrally with the lower portion of the front wall of the reservoir 1 and disposed beneath the undercut 2 is a well 3 having communication with the reservoir through the ports 4, said ports being vertically spaced. The well 3 receives ink from the reservoir 1, as will be readily understood.

Rising from the top of the well 3 is an outwardly inclined filling neck 5 of suitable length. A suitable stopper or closure 6 is removably mounted in the neck 5.

It will be noted that the well 3, the neck 5 and the stopper 6 are disposed beneath the undercut 2. The well 3 has its ends flush with the sides of the reservoir 1. It will thus be seen that a construction has been provided whereby the device will occupy a minimum of space on a desk, table or other support, as distinguished from generally similar devices which include a reservoir and a well projecting forwardly from the forward side of the reservoir. Further, as the undercut 2 extends the width of the reservoir 1, it will be obvious that a pen may be inserted in the well 3 from the sides as well as from the front.

In use, the reservoir 1 is filled through the neck 5, the well 3 and the ports 4. After filling, the device is set in an upright position and the ink will flow into the well 3 from the reservoir 1 until the level of said ink is above the uppermost port 4, thereby closing the same and preventing the passage of air into the reservoir with the obvious result that the flow of ink into the well will cease. Of course, as the ink in the well 3 is used and falls below the uppermost port 4, additional air is admitted to the reservoir to permit the escape of ink therefrom to replenish the supply in the well 3.

It is believed that the many advantages of an ink well constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

I claim:—

An ink well comprising an ink reservoir having its front undercut throughout the width of said reservoir, a well below the undercut extending forward from the front wall of the reservoir and having communication with said reservoir for receiving ink therefrom, said well being substantially coextensive with the width of the reservoir and having a top wall, and an outwardly inclined neck rising from the top wall of the well beneath the undercut in spaced relation thereto.

In testimony whereof I affix my signature.
BRUCE ALLEN THARRINGTON.